July 12, 1932. H. GLASCOCK 1,867,070
AUTOMOBILE ENGINE SUPPORT
Filed Sept. 10, 1931
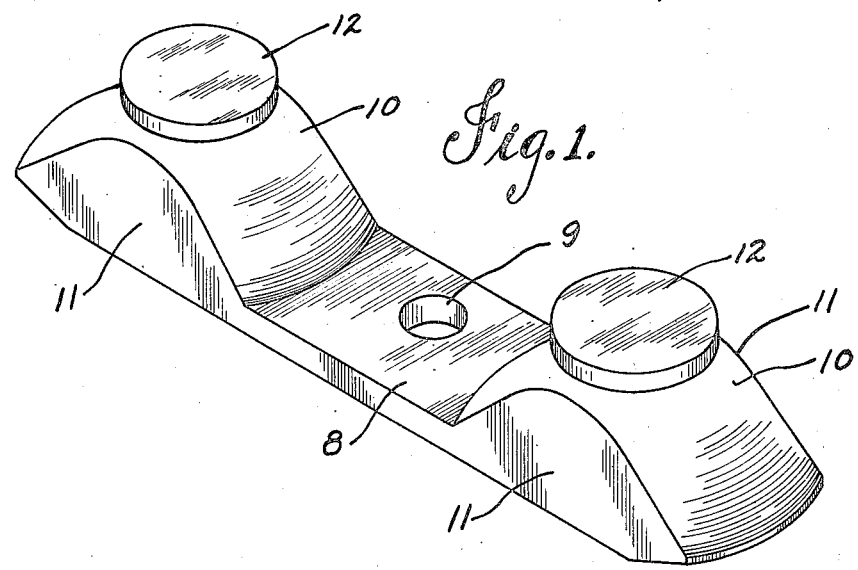
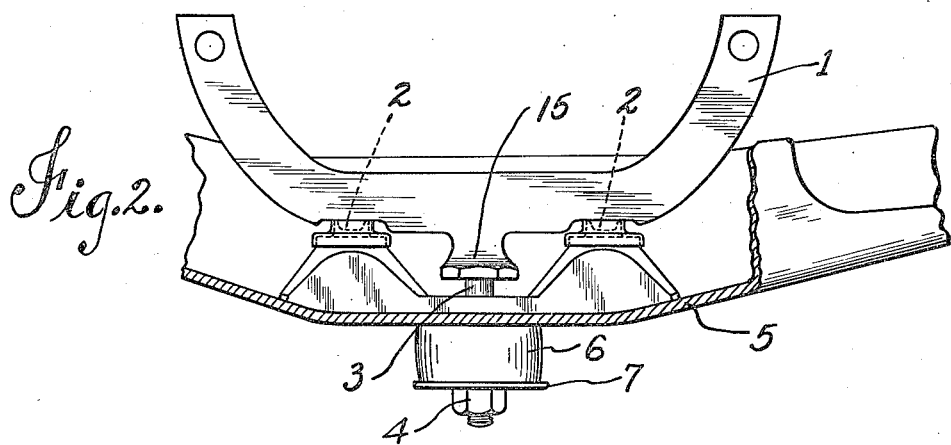
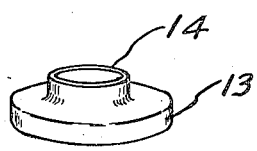
INVENTOR.
Harry Glascock
BY
ATTORNEY.

Patented July 12, 1932

1,867,070

UNITED STATES PATENT OFFICE

HARRY GLASCOCK, OF CINCINNATI, OHIO, ASSIGNOR TO P. O. B. MANUFACTURING CO., INC., OF CINCINNATI, OHIO, A CORPORATION OF OHIO

AUTOMOBILE ENGINE SUPPORT

Application filed September 10, 1931. Serial No. 562,128.

My invention relates to resilient motor supports and specifically to a resilient supporting cushion which may be used to replace metal spring members with which the front end of the motor in a certain well known type of automobile is equipped. There is in use in the United States at the present time, a four cylindered car in which the front end of the motor is supported by a yoke which extends down and is mounted upon a cross frame member of the automobile chassis. This type of automobile has been manufactured in a new model during the last three or four years and considerable difficulty has been experienced in preventing the spring supports on which the front end of the motors have been mounted from developing excessive vibration.

The first Model A motor was bolted directly to the cross member of the frame. Later the yoke and springs as a drop forging were used. More recently the yoke has been made as a stamping.

In the manufacture of this type, when coil springs have been inserted at the sides of a yoke and a leather washer has been used under the central lug and a spring is employed which extends under the chassis frame and secures a mounting bolt with which the yoke is secured to the chassis frame.

The vibratory action of the motor on the chassis frame in a number of cases soon begins to wear the springs out and they are no longer effective. The flat auxiliary spring has proven a source of annoyance and expense because of the fact that it causes rumble and in a very short time crystallizes and breaks and has to be replaced at considerable expense. Garages and service stations have accordingly removed the springs and substituted resilient blocks such as rubber underneath the yokes at the sides and they have further provided stronger springs for securing the mounting bolt to the chassis frame.

The stampings forming the yoke motor support has sharp angles and aligning lugs extend down at the sides of the yoke which cut into rubber blocks and cause them to wear out prematurely.

In my application Ser. No. 533,279, I have provided a front motor support in which resilient blocks are used but in which the blocks are so constructed and guarded that the sharp angles of the metal yoke do not tend to gouge into the rubber blocks and the vibratory pressure of the yoke on the chassis is distributed evenly throughout the entire area of the rubber block.

It is the object of my invention to provide a single rubber supporting member which may be employed to take the entire weight of the yoke and cushion it so that very little vibration results.

It is another object of my invention to provide a resilient support which will not tend to wear out and which is so shaped that the necessary clearance is provided so that it will be simple to install and so that all the space underneath the yoke may be utilized for its cushioning effect.

It is another of my objects to eliminate the use of the auxiliary spring which, as it is now constructed, causes excessive rumble because of the fact that the mounting bolt comes in contact with the metallic auxiliary spring. I further eliminate metal against metal at this point where there is constant friction because of the vibration or perpendicular movement of the mounting bolt caused by vibration of the motor.

It is further an object of my invention to have the bottom surface of the cushioning member slanted upwardly at the ends so that it will seat and align itself on the chassis frame.

It is further my object to provide a resilient support which has an offset opening for the passage of a mounting bolt so that the width of the support may be extended throughout all of the available space underneath the yoke, thereby providing a maximum of cushioning effect. The above objects and other objects to which reference will be made in the ensuing disclosure I accomplish by that certain combination and arrangement of parts of which I have illustrated a preferred embodiment.

Referring to the drawing:

Figure 1 is a perspective view of the resilient motor support.

Figure 2 is a front elevation showing the motor yoke, a section of the chassis frame and the resilient motor support.

Figure 3 is a perspective view of a metal retainer preferably employed on both sides of the support to insure proper registry with the aligning lugs of the yoke.

The yoke to which the automobile engine is bolted is indicated at 1 and as indicated in Figure 2, aligning lugs 2 extend down from underneath the lower surface of the yoke. A bolt 3 extends down from the middle of the yoke and through the auxiliary spring when original equipment is in use, and a nut 4 is secured to the threads in the bolt. The chassis frame is indicated at 5 and conforming to the practice in the copending application to which I have referred, a rubber block 6 having a washer 7 is positioned between the nut 4 and the under surface of the chassis frame member 5.

My preferred type of front motor support consists of preferably a rubber cushioning member having a thin medial portion 8 in which an offset opening 9 is molded so that the mounting bolt 3 may be properly positioned within the opening.

Due to the construction of the stamped yoke, the center of the aligning lugs 2 are not in line with the center of the bolt 3 so that the position of the opening 9 is offset from the middle of the portion 8.

Extending up from the sides of the support are conical members 10 having the front and rear faces cut off as indicated at 11 so as to leave sufficient clearance for the fan pulley and belt.

Extending up from the apices of the cone members 10 are cylindrical blocks 12 which are preferably covered with retaining members 13 having up-turned annular flanges 14 which register with the aligning lugs of the yoke.

As automobiles of this type are now manufactured, there is a leaf spring which extends up underneath the boss 15 on the yoke to which the bolt 3 is secured and my resilient support eliminates the necessity of this spring.

To install my new type of motor support cushion, the fan belt is first removed, the water hose loosened, and the two rear engine support bolts are loosened. The nut underneath the chassis frame is then removed. The front of the motor is then jacked up until the motor supporting yoke clears the cross frame member about one half inch. This clearance remains after the installation of the support so that the leather washer with which these parts are ordinarily equipped is eliminated. When my new resilient support is installed, the leather washer, three coil springs and the leaf is discarded.

The repairman after jacking up the engine, places the retainers 13 on the cylindrical portions 12, slips the bolt 3 through the opening 9 and tightens down on the nut 4.

It will be observed that the use of my new type rubber cushion blocks eliminates the necessity of three coil springs, a leather washer and a leaf spring at the same time providing a resilient cushion which provides a vibrationless support.

It is a further advantage that there is only one position in which my new type support can be placed so that there is no likelihood of a repairman putting the rubber supports in the wrong position.

The upwardly flaring under surface of the support at the side ends, fits compactly within the chassis frame member registering exactly in the middle so that after the block is inserted, the opening 9 will be properly positioned for the insertion of the bolt 3. There is in my entire assembly no metal to metal connection which is the most frequent cause of vibration rumbles. A car can be driven for thousands of miles without any tendency of developing a noisy connection between the yoke and the supporting frame.

To indicate clearly what additional replacement element I provide in Figure 2 the parts provided as standard equipment are the parts 1, 4, 5 and 15, my cushion support replacing above the frame two coil springs, one flat auxiliary spring and one leather washer.

Having thus described my invention, what I claim as new and desire to secure by Letters Patent, is:

1. A cushioned front motor support for an automobile of the character specified comprising an integral rubber block having a pair of upwardly tapering bumper blocks joined with a member of reduced thickness, said member having an opening therein for receiving a mounting bolt for clamping the motor support to the chassis frame.

2. A cushioned front motor support for an automobile of the character specified comprising a pair of upstanding bumper blocks joined with a middle member of reduced cross section to extend past a mounting bolt clamping the motor support to the chassis frame.

3. A cushioned front motor support for an automobile of the character specified comprising an integral rubber block having a pair of upwardly tapering bumper blocks joined at their bottoms with a middle member of reduced cross section to extend past a said member having an opening therein for receiving a mounting bolt clamping the motor support to the chassis frame, said bumper blocks having reduced tops, and retainer caps mounted on said tops with upstanding necks.

4. A cushioned front motor support for an automobile of the character specified comprising an integral rubber block having a pair of upwardly tapering bumper blocks joined with a member of reduced thickness, said member having an opening therein for receiving a mounting bolt for clamping the motor support to the chassis frame, said bumper blocks having cylindrical tops with flanged retainer caps mounted on said cylindrical tops, said caps having upwardly extending annular openings registering with aligning lugs on the under surface of said motor support.

HARRY GLASCOCK.